United States Patent
Rosen

(10) Patent No.: US 7,127,408 B2
(45) Date of Patent: Oct. 24, 2006

(54) METHOD OF CREATING SEASON TICKET PACKAGE

(76) Inventor: Michael J. Rosen, 3870 Poinciana Ave., Miami, FL (US) 33133

( * ) Notice: Subject to any disclaimer, the term of this patent is extended or adjusted under 35 U.S.C. 154(b) by 145 days.

(21) Appl. No.: 10/461,523

(22) Filed: Jun. 13, 2003

(65) Prior Publication Data

US 2004/0254818 A1    Dec. 16, 2004

(51) Int. Cl.
*G01C 21/34* (2006.01)
(52) U.S. Cl. .................. 705/6; 705/8; 705/1
(58) Field of Classification Search .......... None
See application file for complete search history.

(56) References Cited

U.S. PATENT DOCUMENTS 5,253,166 A * 10/1993 Dettelbach et al. .......... 705/5
5,408,417 A *  4/1995 Wilder .......................... 705/5
6,496,809 B1* 12/2002 Nakfoor ....................... 705/80

FOREIGN PATENT DOCUMENTS

JP    3420209 B2 *  6/2003

OTHER PUBLICATIONS

Anolik, Oct. 1983, Travel Weekly v42, p. 85(6) "Agreements with tour operators can save agents (sic) liability woes".*

* cited by examiner

*Primary Examiner*—John G. Weiss
*Assistant Examiner*—Michael Fisher
(74) *Attorney, Agent, or Firm*—Akerman Senterfitt; Michael C. Cesarano

(57) ABSTRACT

A method of selling season tickets is disclosed in which unrelated purchasers may reserve a seat ticket for one or more selected events in a related series of events. When enough seat tickets have been reserved, a season ticket for that seat is sold, and the individual tickets reserved for each purchaser are paid for and delivered to the purchasers. Provisions for canceling previously made reservations are included. The method is effectuated on one or more computers, and the computers may be connected to a computer network, including the internet, to allow use of the system by prospective purchasers at remote locations.

19 Claims, 5 Drawing Sheets

METHOD OF CREATING SEASON TICKET PACKAGE

BACKGROUND OF THE INVENTION

In recent years, sports and cultural exhibition events have become increasingly popular throughout the world. Such popularity is due, in large part, to the widespread broadcasting of sports and cultural events worldwide, and to the marketing and offering of such events as a series of performances, or "packages" to be purchased in advance of the series. The selling of a series of events as a "season ticket" package benefits the sponsoring organization by relieving it of the work associated with selling individual tickets for each event in the series, and by assuring advance payment for each event regardless whether the season ticket holder actually attends each event. The season ticket package also benefits the purchaser of the package by ensuring the purchaser of a specific seat, and of a date and time certain, for viewing each of the performances in the series. Thus, the offering of season ticket packages is a widespread common feature of the environment for viewing sports and cultural events. Unless the context indicates otherwise, "season ticket" refers to a specific seat that is available for use by one or more individuals during a season to attend all related events in a series performed at a facility during the season.

Because tickets in good viewing locations are the most popular, and often are the highest priced, event sponsors may attempt to sell most of the tickets for desirable viewing areas as season tickets. For events having a large number of performances during a season, and also having a relatively large ticket price, it has become problematic for ordinary spectators to afford the total cost associated with purchasing a season ticket, or to attend each event in a season. Yet, the drawbacks to the individual for not purchasing a season ticket include having to purchase individual tickets to those performances the spectator wishes to see; having to accept a less desirable viewing area for each event, depending upon the overall availability of tickets that have not been sold as season tickets; and taking the risk that a ticket for a highly desired event may not be available if the event should be sold out. For the business that sponsors the events, the loss of early season ticket revenue in advance of the season, and the lack of certainty in anticipating the number of overall sales are drawbacks that this invention is intended to remedy.

A popular method for eliminating these risks has been for one person to purchase a season ticket package consisting of one seat (or two or more adjacent or closely proximate seats), and for that person to share the total number of events among two or more persons, each person choosing the individual events that he or she wishes to attend, and paying the season ticket holder for them on a per-event basis. The primary difficulty associated with the sharing of a season ticket package, however, is that people who participate in the sharing arrangement for one season may move away, or otherwise choose not to participate for the next season, leaving the season ticket holder with the problem either of having to find another participant, or of having to pay for more events than the holder wishes to attend. When the number of participants becomes too few, it is common for the season ticket holder to relinquish the season ticket rather than incur the substantial costs of maintaining it.

What is needed is a method for season ticket holders to offer and sell some of their unwanted event tickets to third parties, and for persons who are not season ticket holders to join with a season ticket holder in order to purchase one or more of the event tickets from a season ticket holder, and to view those events from a location that is reserved to season ticket holders. Businesses in the business of offering seats also need a method of selling its season tickets to groups of unrelated persons who want access to the season ticket areas but each of whom is interested in purchasing only a portion of the available tickets.

SUMMARY OF THE INVENTION

In accordance with this invention, a season ticket holder may offer tickets to selected events by posting them on a computer network or an internet site, along with complete information regarding available seat location, number of seats, dates of events, performances covered by each event, and sales price for each ticket. Third parties may see these offerings, purchase tickets for certain events, and make arrangements for payment for those tickets.

In some cases, a season ticket holder will not agree to purchase or renew his or her season ticket unless a predetermined number of tickets are purchased by third parties. In that event, the posting site shall also include information regarding the required level of participation and a cutoff date for the attainment of that level. Persons wishing to participate in that season ticket shall reserve tickets by entering their offers to purchase, and shall provide satisfactory assurances of the payment to be made when and if the predetermined number of ticket reservations has been attained.

If the predetermined number of ticket reservations is attained prior to the cutoff date, then all contingent financial arrangements shall be completed, and the season ticket holder shall purchase the season ticket from the sponsoring organization and shall distribute the tickets to each of the other participants in accordance with their commitments. If the predetermined number of ticket reservations has not been reached by the cutoff date, then the season ticket holder must commit to purchase the season ticket having only the reservations that had been made up to that time, or must release the season ticket and notify all persons holding reservations that the season ticket was not purchased and that contingent financial arrangements for making payments have been released.

Alternative embodiments of the invention include means for third parties to review in real time the number of reservations accepted for a given season ticket and the number of reservations required before the season ticket holder must commit to purchasing the season ticket. This information will permit third parties to assess the likelihood that their reservations will result in a season ticket being purchased, and to make decisions between two or more offerings related to the same event. Other alternative embodiments may include means for third parties to withdraw their reservations under conditions established by the season ticket holder, or for sponsoring organizations to use the system either independently or in conjunction with holders of season tickets for events sponsored by the sponsoring organization.

Accordingly, it is an object of this invention to provide means for a season ticket holder to offer undesired tickets in a series of events to third persons by providing information that can be viewed from a computer or other suitable device attached to a computer network or to the internet. It is another object of the invention to provide third parties with means for attending events by purchasing one or more tickets from a season ticket holder. It is a further object of the invention to provide season ticket holders with a means for soliciting reservations from third parties for tickets to events that the season ticket holder cannot or does not wish to attend. It is yet a further object of the invention to provide financial arrangements for third parties to pay for their tickets where payment is contingent upon the season ticket holder purchasing a season ticket. Yet another object of the invention is to make available to organizations a system for offering season tickets to individuals by providing a format for groups of individuals who are unknown to each other to purchase one or more season tickets directly from the organization. These and other objects of the invention will become apparent in the following description of the preferred embodiments.

DETAILED DESCRIPTION OF THE PREFERRED EMBODIMENTS

Figure 1:
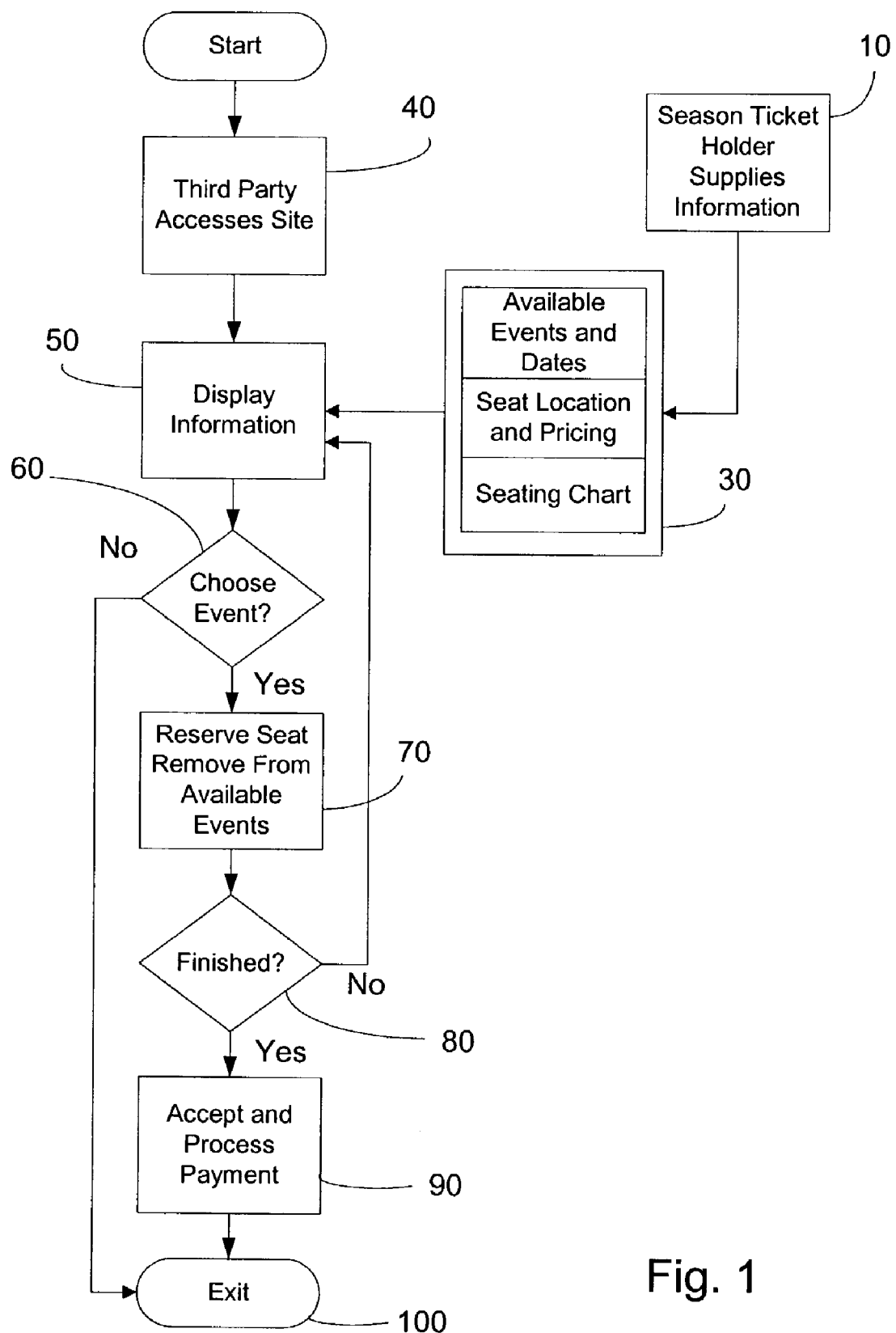
FIG. 1 is a flow chart depicting an embodiment of the invention in its most basic form.
Figure 4:
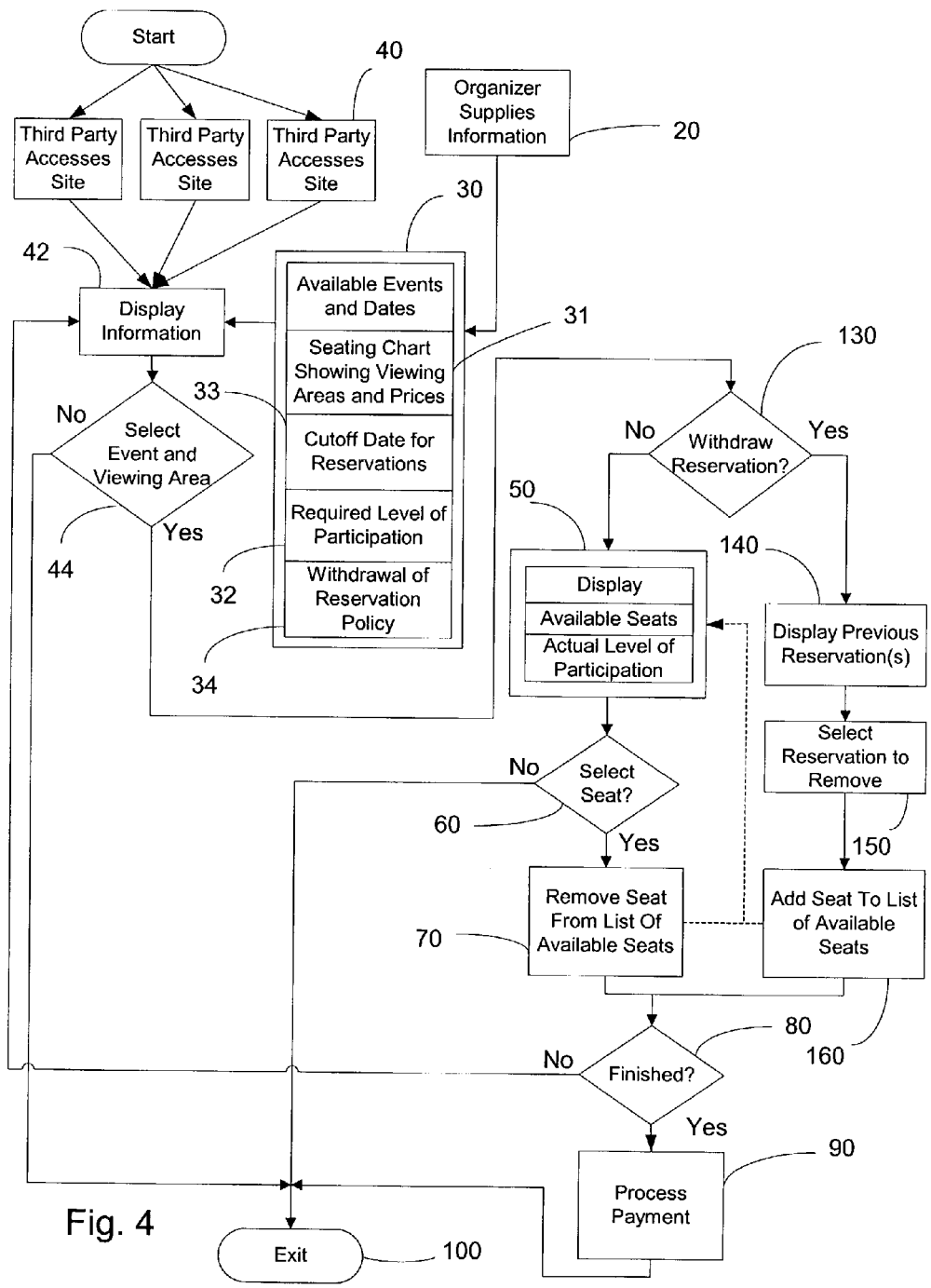
FIG. 4 is a flow chart depicting the steps of the invention when used by a sponsoring organization or other entity having multiple season tickets to offer.

In all drawings, the same reference number will be used to indicate the same, or a substantially similar step in the process of the invention. FIG. 1 is a flow chart depicting an embodiment of a system incorporating the steps of this invention. Information regarding all seasonal events to be presented by a sponsoring organization and related to a specific seat in the stadium, auditorium, arena, theater, or other event locale, is placed upon a site that is part of a computer network. As depicted in FIG. 1, the information is posted by a season ticket holder 10, although it is equally acceptable for such information to be posted by a sponsoring organization, as shown in FIG. 4 at 20. Such information will include, at a minimum, a listing of those performances included in the season ticket for which the specific seat is available, and a price of a ticket for that seat for each available performance 30. The site may also include information such as a seating chart to assist a third party in making a decision whether to purchase a ticket for an event. A third party prospective purchaser will access the site 40 through a computer network or the internet to retrieve a display 50 of such information as is necessary to make a decision regarding available events. The third party may select a particular event from those that are shown as having a seat available 60, and may reserve the seat for the selected event. The seat selected will then be removed from the list of available events selected by the third person 70, and will be reserved for the third party. If the third party wishes to purchase a ticket for other events in the series, he or she will so indicate 80, and will repeat the process by selecting another event. At the conclusion of all such selections, the third party's payment information will be processed 90 and the user may exit the program 100. The system will be available for concurrent or subsequent use by another third party. Repeated uses by third parties will result in season tickets being allocated among various third parties, and season ticket holders being paid for tickets to performances that will be attended by third parties.

Figure 2:
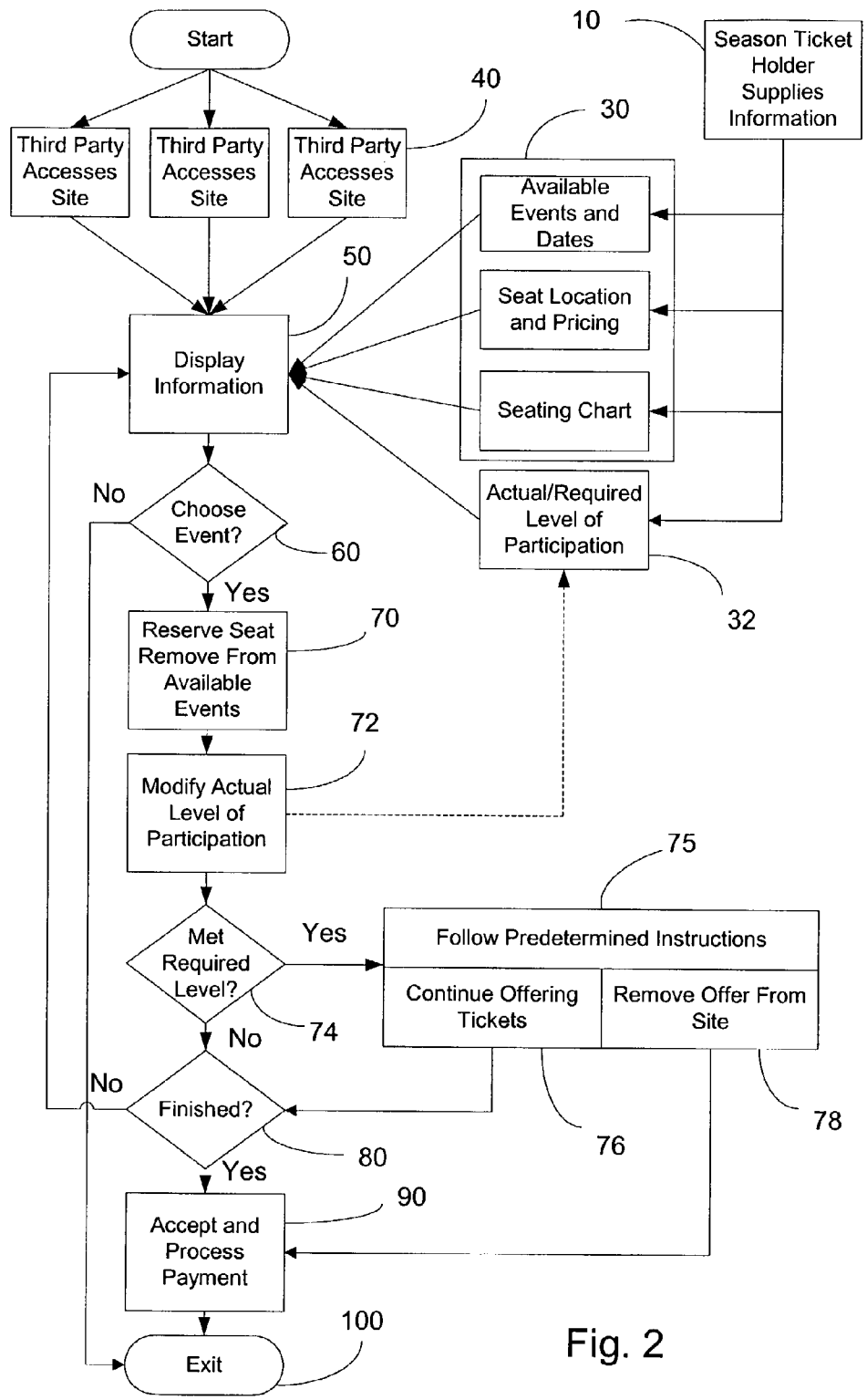
FIG. 2 is a flow chart depicting a second embodiment of the invention in which predetermined events may occur, depending upon the number of reservations existing at any time.

Another embodiment of the invention is depicted in FIG. 2. In this embodiment, the season ticket holder has determined a level of participation that must be met before he or she will commit to purchase a season ticket 32. The requisite level of participation 32 may be included in the display 50 presented to third parties accessing the site 40. The level of participation can be expressed as a number of performances, or as a percentage of the entire season package, or in any other suitable manner. Where the instantaneous level of participation is furnished to third parties who view the site 50, it will provide those third parties with a basis for estimating the chances that a sufficient number of event tickets will be sold, and that a season ticket will be issued for the seat in question. In this embodiment, a reservation must be accompanied by a promise to make payment if a season ticket is purchased, and appropriate arrangements to secure such contingent payment are taken. As tickets are reserved for purchasers 70, the level of participation 32 will be modified 72 and displayed to subsequent third parties 50. When the predetermined level of participation is reached 74, the season ticket will be purchased or other appropriate action taken 75, and event tickets will be distributed to participants according to their reservations. If there are unpurchased event tickets remaining for the season ticket, the season ticket holder may leave the season ticket available for viewing and the acceptance of further reservations 76; or the season ticket holder may remove the season ticket from further solicitation 78 and incur the cost of the unsold tickets.

Figure 3:
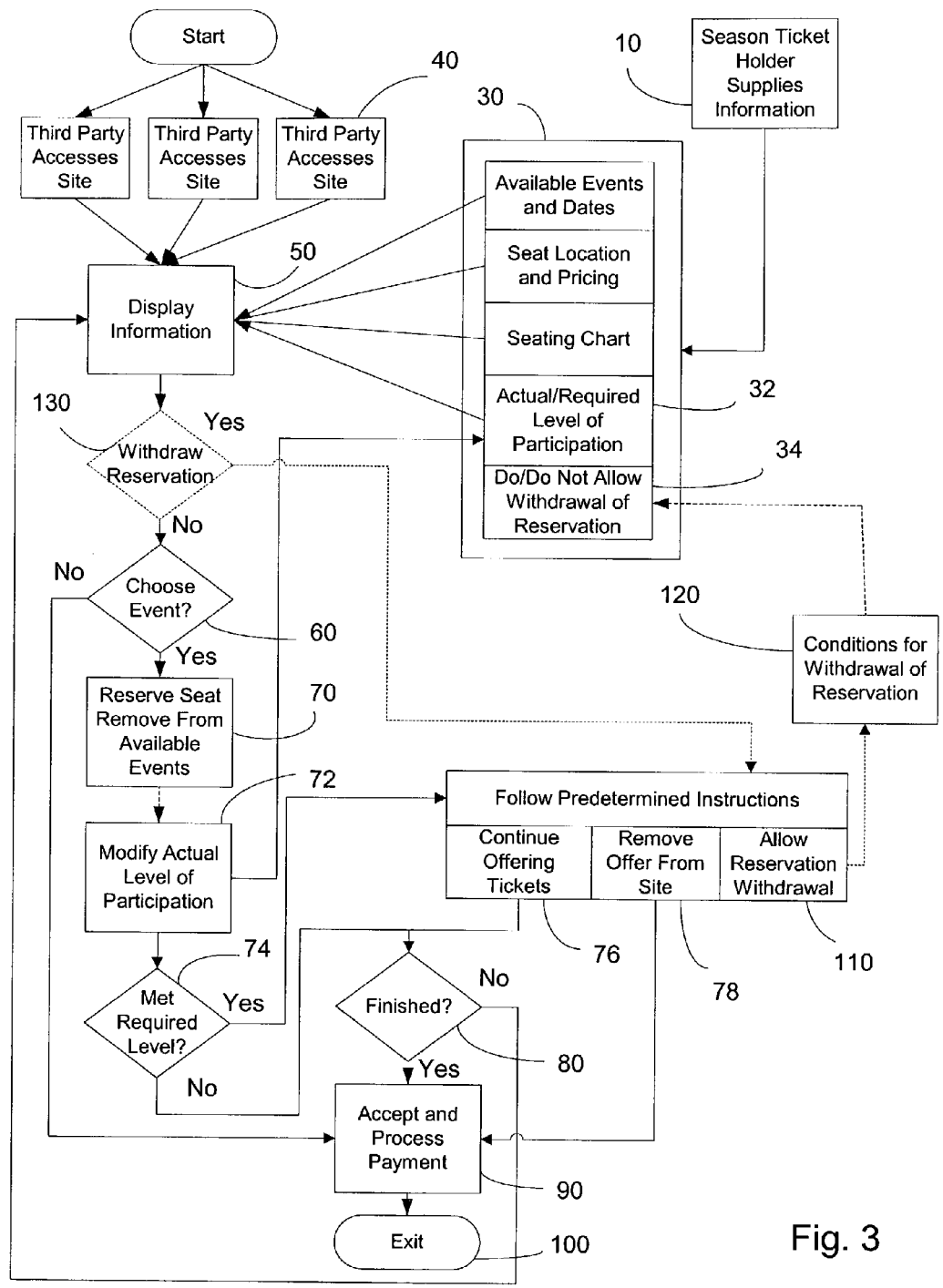
FIG. 3 is a flow chart showing a third embodiment of the invention in which reservations may be withdrawn under predetermined conditions.

A third embodiment of the invention is shown in FIG. 3. In this embodiment, a season ticket holder may allow third parties who have reserved an event ticket to withdraw their reservations under certain circumstances 120. Exemplary of such circumstances might be that another third party has been listed on a waiting list for an event ticket, and will purchase the event ticket that is released by an earlier purchaser; or that the predetermined number of required reservations to purchase a season ticket has been exceeded, and the withdrawal of a single event ticket reservation will not reduce the number of reservations below the predetermined level of participation; or that the third party may withdraw a reservation so long as the withdrawal is accomplished a predetermined number of days prior to the event for which an event ticket was reserved. These examples are not exclusive, as the season ticket holder will normally have the final decision on accepting a withdrawal of a reservation unless contractually restricted from doing so.

In FIG. 3, as information is displayed to the third party 50, if the withdrawal of a reservation is permitted, then that information will be displayed to the user 130. Whether such information is displayed or not may depend upon whether the purchaser has previously purchased an event ticket that could be relinquished, and whether other conditions established by the season ticket holder have been satisfied.

A fourth embodiment of the invention shown in FIG. 4 permits the event organizer to offer season tickets to groups of otherwise unrelated individuals using the same methods disclosed for other embodiments. Here, however, the event organizer may also be able to offer additional services, such as presenting the third party with a number of seating options 31, depending upon the particular event and the third party's choice of ticket prices and seating locations, or including a published cutoff date for the offer 33. In this embodiment, the sponsoring organization takes the place of the season ticket holder, but the system of the invention is otherwise the same. Because event organizers typically permit customers to change seats or date for an event having multiple performances, a choice to withdraw a reservation is given 130, and steps to accommodate that choice by displaying seats currently held 140, allowing the withdrawn reservation to be selected 150, and modifying the list of available seats 160 are shown.

Figure 5:
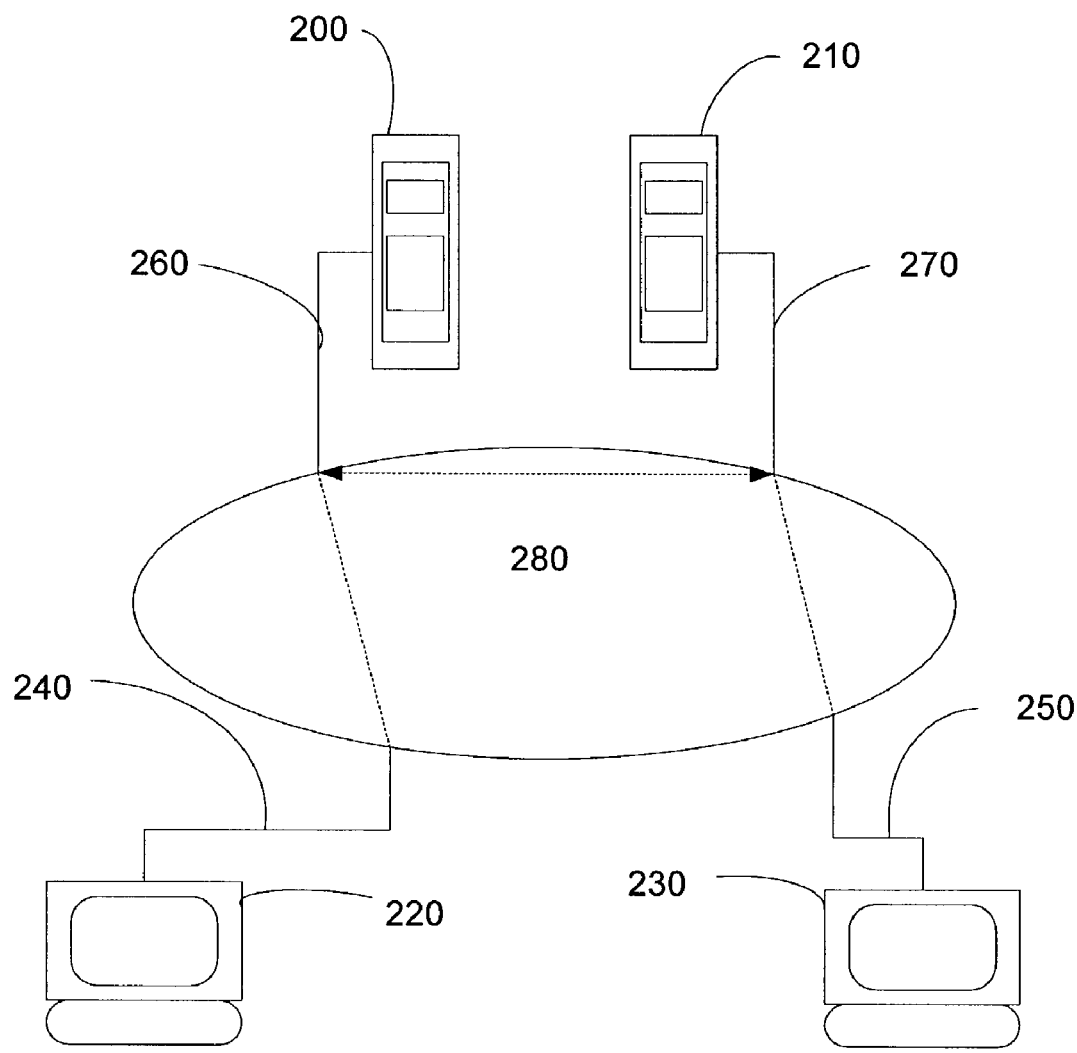
FIG. 5 depicts an embodiment of the invention in which multiple computers communicate across a wide area computer network.

FIG. 5 depicts an embodiment of the invention in which event and seating information is placed on a first computer 200. The first computer may share all or part of its information with a second computer 210. The computers may be part of a local area network or, as depicted, may have individual attachments 260, 270 to the internet or some other wide area network 280. Prospective purchasers using remote computers or other network devices 220 and 230 retrieve information through remote connections 240 and 250, respectively, and reserve or cancel prior reservations in accordance with the methods of the invention. Computers 200 and 210 communicate to update their data to maintain current information regarding reserved and available event tickets. Database sharing and record locking may be used to ensure that the same event ticket is not reserved to simultaneous purchasers.

The invention disclosed and described herein is susceptible of many uses and alternative embodiments, and the methods shown and described are exemplary of the invention, and are not limited either in the order of steps shown, or in the specific conditions that may be imposed upon the sale or withdrawal from sale of reservations and tickets, and one may practice such uses and embodiments without departing from the scope or spirit of the invention disclosed herein, which is limited solely by the appended claims.

What is claimed is:

1. A method for selling a season ticket package, said season ticket package comprising an event ticket to each of a plurality of discrete, related, time differentiated events, said method comprising the steps of:

a. placing upon a first computer storage medium retrievable information describing a season ticket package from which one or more event tickets within said season ticket package are available, the date of each of said events for which an event ticket is available, the location of a seat represented by each said event ticket in said season ticket package, a predetermined number representing a number of event tickets in said season ticket package which must be reserved before said season ticket package will be purchased, and a minimum price for each said available event ticket comprising said season ticket package;

b. displaying said retrievable information to a prospective purchaser of one or more said event tickets;

c. accepting from said prospective purchaser a reservation, said reservation comprising a selection of an event ticket, and payment information, d. reserving said selected event ticket in the name of said prospective purchaser, e. updating said retrievable information by removing said selected event ticket from said event tickets available for sale, f. retaining said reservation until said a predetermined number representing a number of event tickets in said season ticket package have been reserved, g. repeating steps b–e until said predetermined number representing a number of event tickets in said season ticket package that must be reserved has been met or exceeded, h. if said predetermined number has been met or exceeded, processing said payment information for all purchasers having ticket reservations, and delivering said reserved event tickets to said prospective purchasers, and i. if said predetermined number representing a number of event tickets in said season ticket package has not been met or exceeded, canceling all said ticket reservations made by said prospective purchasers.

2. The method of selling event tickets comprising a season ticket package as claimed in claim 1, further comprising the steps of displaying to said prospective purchaser said predetermined number representing a number of event tickets that must be reserved before said season ticket package will be purchased.

3. The method of selling event tickets comprising a season ticket package as claimed in claim 1 wherein said first computer storage medium is connected to the internet and steps b–e are initiated by said prospective user from a device connected to the internet.

4. The method of selling event tickets comprising a season ticket package as claimed in claim 1 wherein said predetermined number representing a number of event tickets that must be reserved before the processing of said reservation and payment information will occur is smaller than the number of total events in said season ticket package.

5. The method of selling event tickets comprising a season ticket package as claimed in claim 1 further comprising the steps of:

displaying to an individual ticket reservations pending in the name of said individual, accepting said individual's selection of a pending ticket reservation for cancellation, removing said pending ticket reservation selected for cancellation from said individual's pending ticket reservations and updating said retrievable information by adding the event corresponding to said individual's cancelled ticket reservation to said event tickets available for sale.

6. The method of selling event tickets comprising a season ticket package as claimed in claim 3 further comprising the steps of:

placing at least a portion of said retrievable information upon a second computer storage medium, performing steps b–e for a second prospective purchaser accessing said retrievable information located upon said second computer storage medium, and updating said retrievable information maintained on said first computer storage medium to include transactions made by said second prospective purchaser.

7. The method of selling event tickets comprising a season ticket package as claimed in claim 1 wherein said retrievable information describing a season ticket package from which one or more event tickets within said season ticket package are available for purchase includes a date upon which, if said predetermined number of event tickets comprising said season ticket package have not been reserved, all said ticket reservations made by said prospective purchasers will be canceled.

8. The method of selling event tickets comprising a season ticket package as claimed in claim 1 wherein, upon the satisfaction of one or more predetermined conditions, a prospective purchaser holding a reservation will be permitted to withdraw said prospective purchaser's reservation.

9. The method of selling event tickets comprising a season ticket package as claimed in claim 8 wherein one of said one or more predetermined conditions is that a predetermined number of event ticket reservations have been made.

10. The method of selling event tickets comprising a season ticket package as claimed in claim 8 wherein one of said one or more predetermined conditions is that another prospective purchaser is willing to reserve the event ticket that becomes available when said prospective purchaser's existing reservation is withdrawn.

11. The method of selling event tickets comprising a season ticket package as claimed in claim 8 wherein one of said one or more predetermined conditions is that said withdrawal of said prospective purchaser's existing reservation takes place not later than a predetermined length of time before the event for which said reservation was made.

12. A method of selling a plurality of event tickets comprising a season ticket package for viewing one or more events in said season ticket package comprising the steps of:
   a. placing upon a first computer storage medium retrievable information describing a season ticket package from which one or more event tickets within said season ticket package are available for purchase from one having the right to sell event tickets within said season ticket package, the date of each of said events for which an event ticket is available, the viewing location of the seat represented by said season ticket package, and a price for each said available event ticket comprising said season ticket package;
   b. displaying said retrievable information to a prospective purchaser of one or more said event tickets;
   c. accepting from said prospective purchaser a reservation, said reservation comprising a selection of an event ticket, and payment information,
   d. reserving said selected event ticket in the name of said prospective purchaser,
   e. updating said retrievable information by removing said selected event ticket from said tickets available for sale,
   f. retaining said reservation until a predetermined number of event tickets comprising said season ticket package have been reserved,
   g. repeating steps b–e until a predetermined number of event tickets comprising said season ticket package have been reserved,
   h. if said predetermined number of event tickets comprising said season ticket package have been reserved, processing said payment information for all purchasers having ticket reservations, and delivering said reserved event tickets to said prospective purchasers.

13. The method of selling event tickets comprising a season ticket package as claimed in claim 12 wherein, upon the satisfaction of one or more predetermined conditions, a prospective purchaser holding a reservation will be permitted to withdraw said prospective purchaser's reservation.

14. The method of selling event tickets comprising a season ticket package as claimed in claim 13 wherein one of said one or more predetermined conditions is that a predetermined number of event ticket reservations have been made.

15. The method of selling event tickets comprising a season ticket package as claimed in claim 13 wherein one of said one or more predetermined conditions is that another prospective purchaser is willing to reserve the event ticket that becomes available when said prospective purchaser's existing reservation is withdrawn.

16. The method of selling event tickets comprising a season ticket package as claimed in claim 13 wherein one of said one or more predetermined conditions is that said withdrawal of said prospective purchaser's existing reservation takes place not later than a predetermined length of time before the event for which said reservation was made.

17. The method of selling event tickets comprising a season ticket package as claimed in claim 13 wherein one of said one or more predetermined conditions is that said prospective purchaser's existing reservation may be withdrawn upon said prospective purchaser's selection of an alternative reservation.

18. A method of selling an event ticket from a plurality of event tickets comprising a plurality of season ticket packages comprising the steps of:
   a. placing on a first computer storage medium retrievable information, said retrievable information comprising a description of said plurality of events for which tickets are available from said plurality of season ticket packages, the dates of said events, the viewing locations of seats for said events, the prices for each available event ticket, and, for each said season ticket package in said plurality of season ticket packages, a number representing a number of event tickets in said season ticket package that must be reserved before said season ticket package will be purchased;
   b. displaying to a prospective purchaser of one or more said event tickets a portion of said retrievable information including at least said description of said plurality of events for which tickets are available, the date of said events, and the viewing locations of seats for said events;
   c. accepting from said prospective purchaser a reservation, said reservation comprising a selection of an event ticket and payment information;
   d. reserving said selected event ticket in the name of said purchaser;
   e. updating said retrievable information by removing said selected event ticket from said plurality of event tickets available for sale;
   f. identifying the season ticket package from which said selected event ticket was selected;
   g. determining a total of all reserved event tickets comprising said identified season ticket package, and, if said total of all reserved tickets is less than said predetermined number for said identified season ticket package, retaining said reservation until said predetermined number of event tickets comprising said identified season ticket package have been reserved;
   h. and, if said total of all reserved event tickets meets or exceeds said predetermined number, processing said payment information for all prospective purchasers having ticket reservations within said identified season ticket package, and delivering said reserved event tickets to said prospective purchasers.

19. A method of selling a plurality of event tickets as claimed in claim 18, further comprising the display of said retrievable information as categorized, first, by event, and second, by viewing location.

* * * * *